United States Patent [19]

Schimming

[11] 4,335,524

[45] Jun. 22, 1982

[54] SPIRIT LEVEL

[76] Inventor: Fred H. Schimming, 3407 NW. 39 Apt. 140, Oklahoma City, Okla. 73112

[21] Appl. No.: 211,482

[22] Filed: Nov. 28, 1980

[51] Int. Cl.$^3$ ............................................... G01C 9/28
[52] U.S. Cl. ........................................ 33/388; 33/379
[58] Field of Search .................... 33/368, 373, 384–388

[56] References Cited

U.S. PATENT DOCUMENTS

| | | | |
|---|---|---|---|
| 1,300,818 | 4/1919 | Collins | 33/368 |
| 1,794,254 | 2/1931 | Sherwood | 33/373 |
| 2,993,281 | 7/1961 | Dock | 33/384 |
| 3,871,109 | 3/1975 | Vaida | 33/379 |

FOREIGN PATENT DOCUMENTS 89836  9/1921  Switzerland .......................... 33/385

*Primary Examiner*—Charles E. Phillips
*Attorney, Agent, or Firm*—Robert K. Rhea

[57] ABSTRACT

A level formed by a frame having opposing longitudinal working surfaces and a transverse opening in the frame supporting a ring assembly for angular rotation in a longitudinal plane of the frame. A spheroid vial containing a bubble indicator is supported by the ring assembly with its major axis extending diametrically across the inner periphery of the ring assembly to register a level position when the major axis of the vial is disposed in a horizontal plane. Angle indicating indicia is scored on the surface of plates abutting opposing sides of the frame and maintaining the ring assembly within the frame opening for indicating selective angular alignment of the major axis of the vial with respect to the plane of the working surface whereby preselected orientation of the vial with the angle indicia indicates a preselected angular relationship of the vial major axis and a working surface when the working surface is in contact with the surface being measured. A permanent magnet, slidably supported by the frame, releasably holds the ring assembly in selected positions of the vial relative to the plane of the working surface.

6 Claims, 4 Drawing Figures

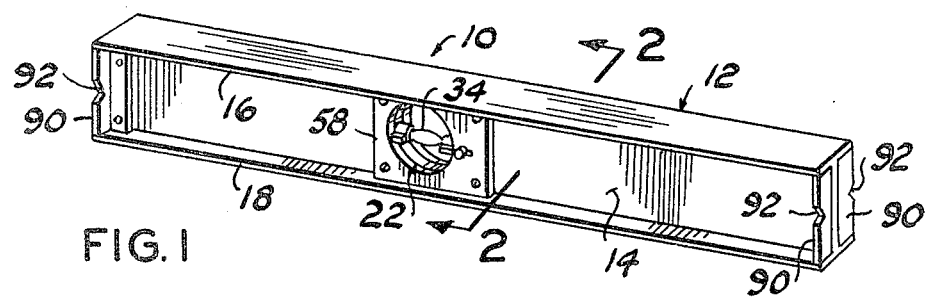
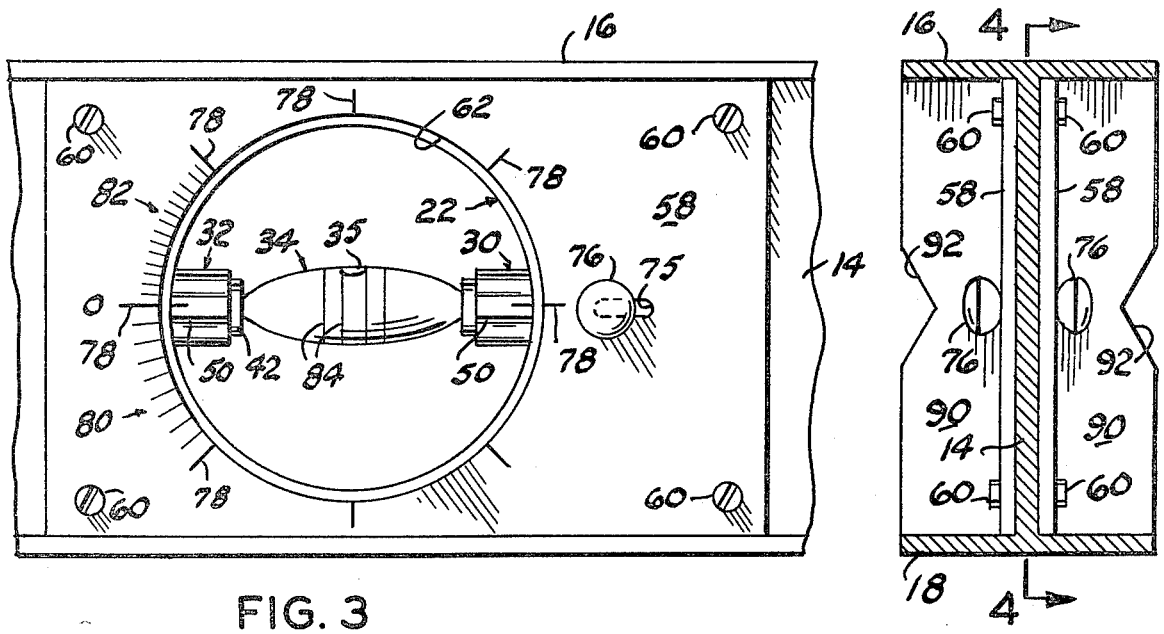
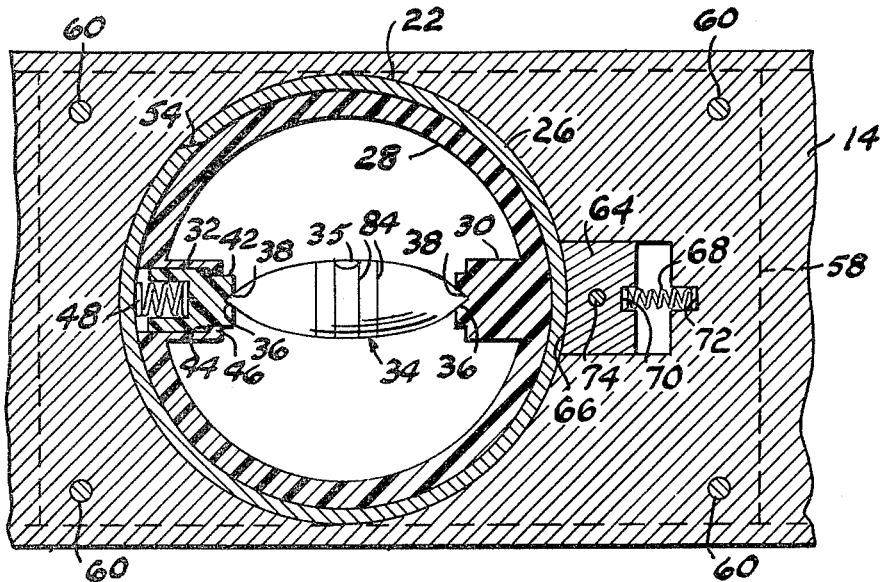

1

SPIRIT LEVEL

BACKGROUND OF THE INVENTION

1. Field of the Invention

The present invention relates to a spirit level having an ellipsoid vial so that the vial bubble is always in an upward position.

Construction levels are usually provided with a fixed position spirit vial longitudinally disposed intermediate its ends and at least a second fixed position vial normal to the longitudinal axis of the level body adjacent one or both of its respective end portions for use in construction work, such as checking horizontal or vertical surfaces. It is desirable that the level be provided with an adjustable spirit vial which may be selectively disposed by movement relative to the body of the level for indicating the degree of inclination of a surface under test or for disposing the vial at a selected angular setting to obtain a desired slope for a surface.

2. Description of the Prior Art

U.S. Pat. No. 2,993,281 discloses a level body having a transverse aperture rotatably supporting a spirit vial in which the degree of inclination is obtained by rotating the vial and its holder relative to the level body to center the vial bubble with the slope indicated by degree indicia scored on the level body. The vial bubble is maintained upright in this patent by a counterweight rotating the vial holder in response to gravitational attraction.

This invention is distinctive over this patent and the prior art disclosing rotatable spirit vials by employing an ellipsoid spirit vial easily removed from its spring urged holder and in which the vial bubble constantly remains upright regardless of the lateral inclination of the level body. The ellipsoid vial and its holder is rotatable relative to the level body throughout 360° with the desired angular setting of the vial being maintained by a magnet.

SUMMARY OF THE INVENTION

In one embodiment, an elongated level body, preferably an I-beam, is provided with a transverse aperture through its web medially its ends. A spirit vial supporting ring assembly is disposed within the opening and rotatable in the plane of the web. Diametrically opposed lugs on the inner periphery of the ring assembly removably supports an ellipsoid spirit vial. A magnet, slidably supported by a recess in the web communicating with the opening, maintains the ring assembly in a selected angular position. A pair of plates cooperatively apertured abuts opposing sides of the web to expose the ring assembly and maintains the ring assembly in the opening, the plates being provided with indicia indicating degrees.

In another embodiment the ellipsoid vial is supported by the legs of a U-shaped frame forming a line level.

The principal object of this invention is to provide a level having a removable ellipsoid vial mounted for angular rotation on an axis normal to the longitudinal axis of the level and providing full view of the vial bubble during lateral tilting of the level and which includes indicia indicating the attitude of the inclination of the level frame and having magnetic means for maintaining the vial support at a selected angular position relative to the level frame.

BRIEF DESCRIPTION OF THE DRAWINGS

FIG. 1 is a perspective view of the level;

FIG. 2 is a vertical cross sectional view, to a larger scale, taken substantially along the line 2—2 of FIG. 1;

FIG. 3 is a fragmentary side elevational view, to a larger scale, of the central portion of the level;

FIG. 4 is a vertical cross sectional view taken substantially along the line 4—4 of FIG. 2;

DESCRIPTION OF THE PREFERRED EMBODIMENTS

Figure 5:
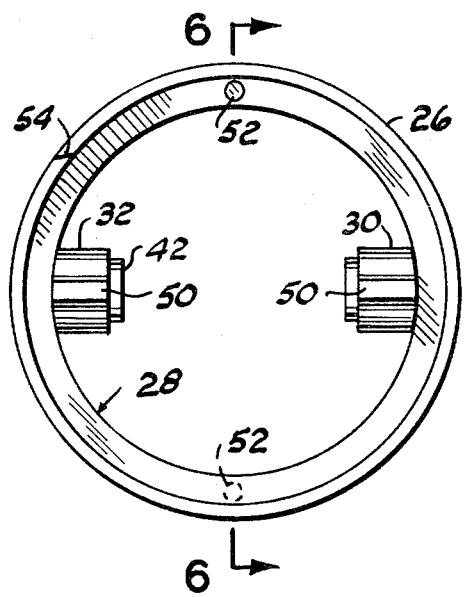
FIG. 5 is a side elevational view of the spirit vial support ring assembly with the spirit vial removed.

Like characters of reference designate like parts in those figures of the drawings in which they occur.

In the drawings:

The reference numeral 10 indicates the level preferably having a metallic body 12 of I-beam shape in transverse section defined by a web 14 and outer parallel flanges 16 and 18 forming a first pair of working surfaces. The other sides of the body define a second pair of parallel working surfaces. Medially its length, the web 14 is transversely apertured to form a circular opening 20 for receiving a spirit vial support assembly 22. A rectangular recess 24 extends through the web, medially its height, and communicates with the opening 20, for the purpose presently explained.

The spirit vial assembly 22 comprises an outer metallic ring 26 surrounding a preferably plastic material inner ring assembly 28 having an integral pair of diametrically oppositely disposed generally cylindrical lugs 30 and 32 disposed in axial alignment on its inner periphery for removably supporting a spirit vial 34. The spirit vial 34 is a spheroid filled with an antifreeze solution to form a bubble 35 and is characterized by a conical tip 36 at the respective end of its major axis which is cooperatively received by coaxial conical recesses 38 formed in the confronting surfaces of the lugs 30 and 32, the lug 30 being imperforate except for its conical recess 38. The lug 32 is hollow with its bore 40 interrupting an arc of the ring assembly circumference for slidably receiving a plunger 42 having an annular shoulder 44 facing the vial 34 which abuts an annular inwardly projecting flange 46 formed on the end of the lug 32 facing the vial. The plunger 42 is coaxially bored from its end opposite the conical recess 38. A spring 48 is nested by the plunger bore and bears against the inner surface of the ring 26. The periphery of each of the lugs 30 and 32 is provided with longitudinally coextensive diametrically opposite wings 50 projecting laterally of the plane of the web 14 for the purpose of angularly rotating the vial assembly 22 within the opening 20, as presently explained.

Figure 6:
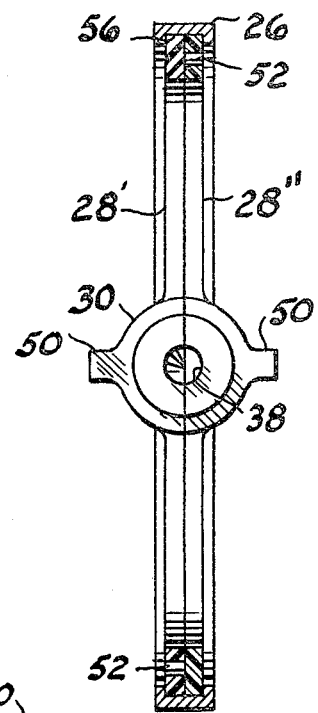
FIG. 6 is a vertical cross sectional view, to a larger scale, taken substantially along the line 6—6 of FIG. 5.

As shown by FIG. 6, the ring assembly 28, with the exception of the plunger 42 and spring 48, is preferably formed by opposing halves 28' and 28" which are mirror images of each other and are joined in abutting relation and secured against relative rotation between the halves by a pin 52 secured to the respective half 28' and 28" projecting through a suitable aperture in the opposite half. The ring 26 is preferably a split ring, as indicated by the heavy line 54, and is provided with an annular groove 56 on its inner periphery which circumferentially nests the ring assembly 28.

The vial assembly 22 is maintained in the plane of the web by a pair of rectangular plates 58 disposed on opposing sides of the web and secured thereto, as by screws 60. The plates 58 are each provided with a circular opening 62 overlapping a circumferential edge portion of the vial assembly 22.

A generally rectangular permanent magnet 64 is slidably disposed within the rectangular opening 24, between the plates 58, for movement toward and away from the adjacent peripheral portion of the ring 26. The permanent magnet 64 is characterized by an arcuate surface 66 formed on an arc complemental with the arcuate peripheral surface of the ring 26. A spring 68, having one end portion nested by a socket 70, formed in magnet 64, and its other end nested by a cooperating socket 72 formed in the wall of the I-beam web 14, defining the rectangular opening 24, normally biases the magnet 64 toward the ring 26. The purpose of the magnet 64 is to normally prevent angular rotation of the vial assembly 22 relative to the level body 12. The magnet 64 is further characterized by a transverse bore for receiving a threaded shaft 74 projecting beyond opposing outer side surfaces of the plates 58 through cooperating slots 75 and secured to a pair of knobs 76. The purpose of the knobs 76 is to permit the user to manually overcome the resistance of the spring 68 to move the magnet 64 out of contact with the ring 26 and permit angular rotation of the vial assembly 22 within the opening 20.

Each of the plates 58 are scored on their outer surface adjacent the opening 62 with 45° spaced radial lines 78 with one of the lines indicating a zero position medially the height of the web 14 and diametrically opposite the magnet 64. A cooperating score mark is formed on the respective wing 50. The surface of the plates 58, on either side of the zero position, are provided with indicia in the form of equally spaced score marks 80 and 82 extending through an arc of 45° and representing 5° and 3°, respectively, between the scored marks. The vial 34 is provided with a plurality of circumferentially scored lines 84 extending around its minor axis portion indicating a 4° tilt of the major axis of the vial by displacement of the bubble 35 in either direction from its horizontal indicating position with the central pair of lines 84 spanning the position of the bubble 35 when the major axis of the vial is horizontal. The purpose of the vial lines 84 is for cooperative angular measurement of a slope in combination with the angle indicating indicia 80 and 82 scored on the plates 58.

The level 10 is further characterized by a pair of right angular members 90 secured to the respective end portions of the frame 12 with one leg of the respective angle abutting the web 14 between the flanges 16 and 18 with the other leg of the angle member living in a vertical plane defining the end surface of the web and flanges. The outwardly projecting leg of each angle member is centrally provided with a V-shaped notch 92 for the purpose of disposing one of the second pair of surfaces of the level longitudinally on a pipe, or the like, not shown, to measure the slope thereof.

Figure 7:
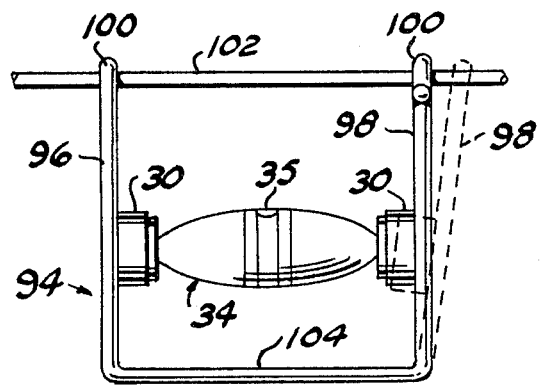
FIG. 7 is a side elevational view of a line level.
Figure 8:
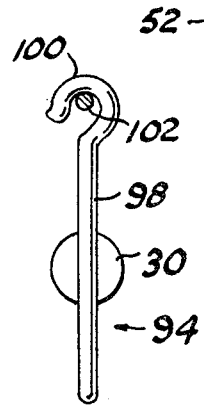
FIG. 8 is a right end elevational view of FIG. 7.

Referring also to FIGS. 7 and 8, a line level frame 94 is formed by a generally U-shaped spring steel rod defined by a pair of legs 96 and 98 having their free ends arcuately curved to form hooks 100 for hanging the frame on a cable or rod 102. Each of the legs 96 and 98 have one of the lugs 30 secured thereto in confronting axially aligned relation for receiving the ellipsoid shaped vial 34 with its major axis parallel with the bight portion 104 of the U-shaped frame.

OPERATION

In operation, with the level 10 assembled as described hereinabove either one of the first pair of surfaces 16 or 18 may be longitudinally disposed on a surface to determine its slope by the position of the bubble 35. Similarly, the notches 92, on either one of the second pair of surfaces, may be disposed on a peripheral portion of a pipe, or the like, for determining its slope by the position of the bubble 35.

A desired slope for a surface may be obtained by manually releasing the magnet 64 from engagement with the ring 26 by moving one of the knobs 76 longitudinally of the web 14 and manually rotating the vial assembly 22 by grasping one or more of the wings 50 to dispose the major axis of the vial 34 in alignment with one of the degree markings or a multiple of the respective values thereof on the plates 58. If the desired degree of a slope is not equal to or a multiple of either one of the degree indicia then the degree score lines on the vial 34 is integrated with the scales 80 or 82 in the manner of Vernier calibration. For example, if a 1° slope is desired to be obtained, the vial is aligned with the 5° mark on the plate adjacent the zero position which moves the vial bubble 35 toward the right, as viewed in FIGS. 3 and 4, to dispose it between the pair of lines 84 opposite the zero position. The 4° displacement of the bubble 35 is subtracted from the 5° setting of the vial thus indicating an inclination of 1° for either of the first pair of surfaces 16 or 18. Thus it may be seen the desired angle or slope is determined or obtained by adding or subtracting the 4° displaced position of the bubble 35 between the vial lines 84 to the 3° or 5° spaced lines 80 or 82 or a multiple thereof on the plates as the bubble 35 moves toward the right or left in accordance with the angular rotation of the vial assembly 22 when measuring or calibrating a slope. The spheroid shape of the vial 34 permits the use of any one of the surfaces of the first or second pairs of working surfaces in measuring or calibrating a slope.

In the event of vial breakage, a new vial is easily installed by simply inserting one end thereof into the recess 36 of the lug 32 and moving the plunger 42 inwardly against the resistance of the spring 48 to permit the other end of the vial to be inserted into the recess 38 of the lug 30.

Similarly, the vial 34 is removed from the level 10 by moving the vial 34 longitudinally against the plunger 42 for inserting the vial between the legs of the line level frame 94 wherein one of the legs 98 is sprung toward its dotted line position for receiving the vial.

Obviously the invention is susceptible to changes or alterations without defeating its practicability. Therefore, I do not wish to be confined to the preferred embodiment shown in the drawings and described herein.

I claim:

1. A level comprising:
   an elongated I-beam body having a web and parallel flanges forming a first pair of working surfaces;
   a spheriod vial having a conical-shaped tip at the respective end of its major axis and containing bubble indicating means and having bubble registery means adapted to register a level position when the major axis of the vial is disposed in a preselected plane and either one of said first pair of working surfaces is in contact with a surface being measured;

adjustable mounting means for rotating said vial relative to said body for variable angular alignment of the major axis of the vial with respect to the planes of said first pair of working surfaces, said mounting means including a ring assembly supported on its periphery in an opening formed in said web for rotation about an axis normal to the plane of said web, said ring assembly having axially aligned diametrically opposed cylindrical lugs secured to its inner periphery, one of said lugs having an axial bore and having an annular inwardly projecting flange at its end projecting toward the other said lug;

a plunger axially slidable in the lug bore and having a diametrically reduced end portion confronting said other lug and forming an annular shoulder normally abutting said annular flange, said plunger having an axial bore in its other end portion;

a spring normally biasing said plunger toward said other lug, said plunger and said other lug having coaxially aligned conical recesses in their confronting surfaces for nesting the conical tips of said vial, said lugs each having diametrically opposed laterally projecting wings for angularly rotating said ring assembly relative to said web; and, a pair of plates secured to opposing sides of said web for maintaining said ring assembly within the web opening, said plates having transversely aligned openings exposing the vial and having radially oriented angle calibrating indicia scored thereon adjacent the respective aligned opening, whereby the major axis of the vial may be selectively aligned with the angle indicia to permit selective indication of the position of the first pair of working surfaces when one of the working surfaces is in contact with a surface being measured.

2. The level according to claim 1 and further including:

magnetic means including a magnet slidably supported by a recess formed in said web and communicating with the web opening for movement toward and away from the ring assembly for normally preventing angular rotation of the ring assembly relative to the level body.

3. The level according to claim 2 in which said mounting means further includes:

a band-like ring having an annular groove in its inner periphery nesting the periphery of said ring assembly.

4. The level according to claim 3 in which said spheroid vial is provided with at least two visible indicators surrounding its minor axis portion in parallel relation on diametrically opposite sides of the vial bubble for forming said bubble registry means.

5. The level according to claim 3 and further including:

end member means extending between said body flanges and secured to opposing sides of said web at the respective end portion of said body for forming a second pair of working surfaces normal to the planes of said first pair of working surfaces.

6. The level according to claim 5 in which at least one working surface of said second pair of working surfaces is provided with at least one transverse groove for nesting a peripheral portion of an arcuate surface being measured.

* * * * *